Nov. 30, 1965     B. K. BARBER     3,220,293
METAL SEVERING APPARATUS
Filed Dec. 16, 1963     2 Sheets-Sheet 1
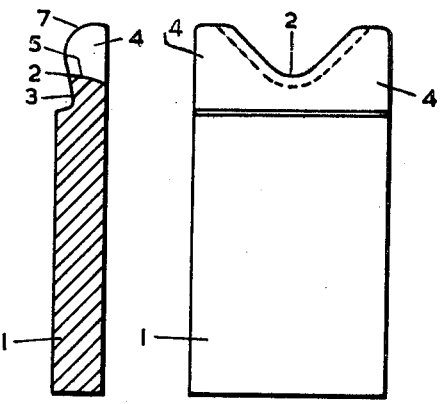
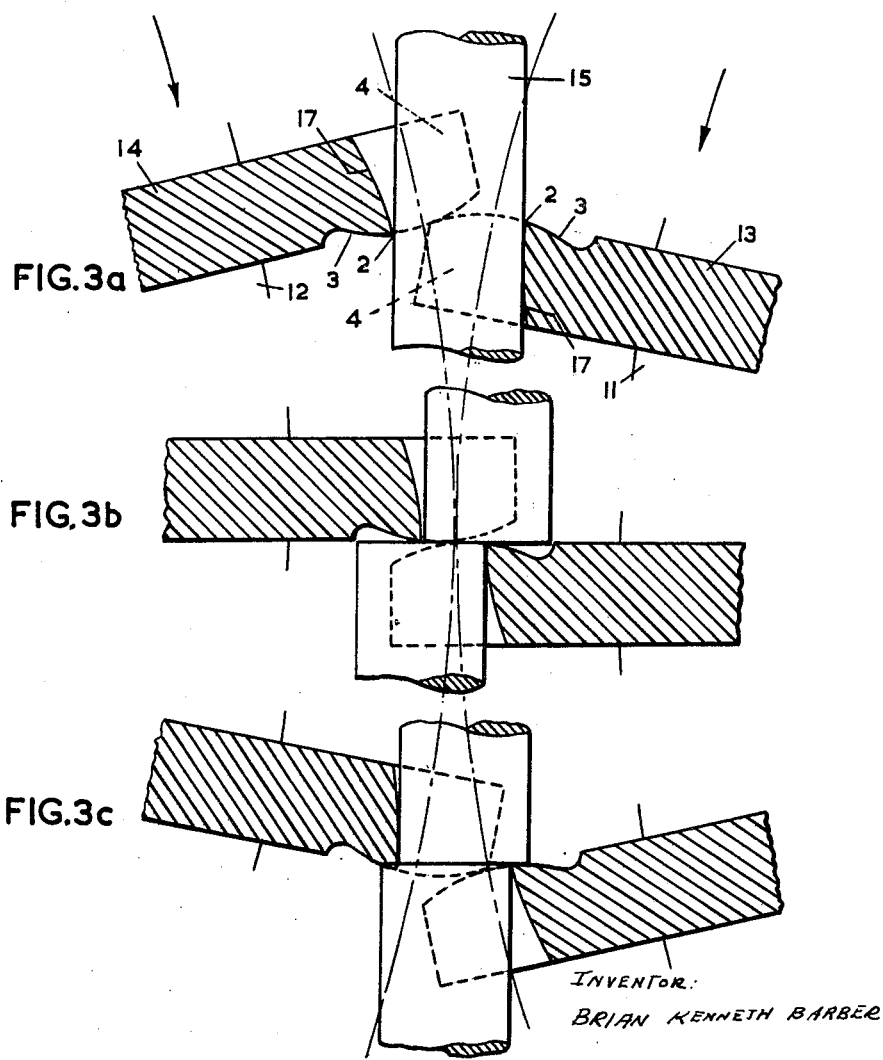
INVENTOR:
BRIAN KENNETH BARBER Nov. 30, 1965   B. K. BARBER   3,220,293
METAL SEVERING APPARATUS
Filed Dec. 16, 1963   2 Sheets-Sheet 2

INVENTOR:
BRIAN KENNETH BARBER

United States Patent Office 3,220,293
Patented Nov. 30, 1965

3,220,293
METAL SEVERING APPARATUS
Brian Kenneth Barber, Chesham, England, assignor to The British Oxygen Company Limited, a British company
Filed Dec. 16, 1963, Ser. No. 330,994
4 Claims. (Cl. 83—345)

This invention relates to apparatus for severing a moving length of metal of relatively constant cross-section.

One known apparatus for severing moving lengths of metal, such as steel rod of from 12 standard wire gauge up to ½ inch diameter, for example, is to pass the metal between two similar rotating drums which carry radially extending chisel-shaped cutter blades which move together circumferentially to sever the metal as it passes midway between the parallel axes of the drums. A disadvantage of this apparatus is that produces a ragged or chisel-shaped end on the severed metal, and ends of this shape are not always acceptable for certain applications, for example when the severed length is used as the core rod for certain flux coated welding electrodes, where a relatively smooth end extending transversely of the rod is preferred.

An object of the present invention is the provision of apparatus for severing lengths of metal leaving a more acceptable end than is obtained with this known apparatus.

According to the present invention, apparatus for severing moving metal stock of elongated form and relatively constant cross-section, comprises two rotatable drums having parallel axes, and one or more equally spaced shearing blades mounted on and rotatable with each drum, each pair of shearing blades having similar opposed shearing edges which are formed so that during the severing operation they together contact at least 50% of the cross-sectional periphery of the stock, and each shearing blade having guide portions which extend beyond its shearing edge radially outwards of the drum, the guide portions of the two shearing blades having engaging surfaces of conjugate form such that the two shearing edges engage opposed points of the stock during the severing operation, and one of the surfaces defining each shearing edge being raked from the truly radial position to reduce damage to the severed ends.

The engaging surfaces of the guide portions may be of involute form. The shear edges do not cross the pitch circle during the severing operation. Preferably each of them does not penetrate more than 25% into the stock diameter.

The guide portions may be so formed longitudinally of the shear edge as to direct stock towards the shear edge.

The present invention will now be described by way of example with reference to the accompanying drawings, in which:

FIGURES 1 and 2 are side and front elevations respectively of a shear blade,

FIGURE 3 shows in plan view the cutting action of similar shear blades,

Figure 4:
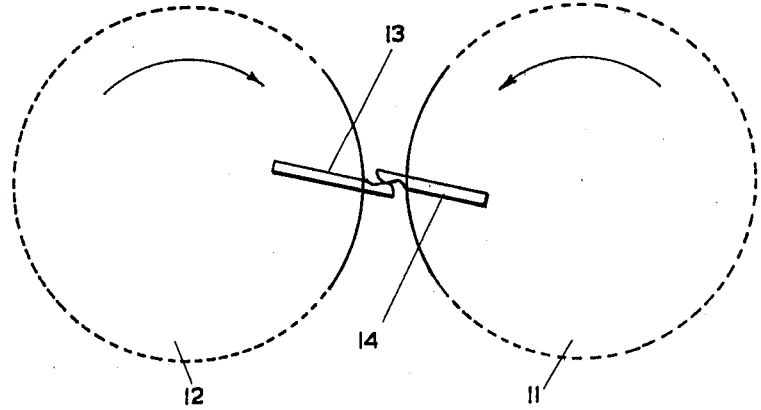
FIGURE 4 shows a diagrammatic plan view of the rotatable drums carrying the shear blades.

Referring to FIGURES 1 and 2 of the drawings, the shear blade comprises a shank 1, in this instance of ¾ inch by 9/16 inch cross-section, formed at one end with a part-circular shearing edge 2 for severing steel rod of circular cross-section. The cutting face 3 defining the shearing edge is raked back towards the shank 1, for a purpose to be described hereafter. Radially outwards of the shank, the shear blade is provided with two guide portions 4 which extend beyond the shearing edge. In front elevation these guide portions define a V-shaped notch the lower part of which is formed by the part-circular shearing edge 2. The radius of curvature of the shearing edge is slightly greater, say 10%, than the radius of curvature of the steel rod to be severed. The shearing edge is defined by the intersection of the plane cutting face 3 and a part-cylindrical rod support face 5. This support face 5 forms part of a cylinder whose longitudinal axis is approximately tangential to the pitch circle although inclined, through a small angle of say 3°, towards the pitch circle at the shearing edge end. The rod support face is "backed off" through an angle of approximately 15° at the side remote from the shearing edge.

As seen in side elevation, the tip 7 of the guide portions at the shearing edge side is of involute form. The involute is terminated at the pitch circle as a result of the cutting face 3 being raked back, through an angle of approximately 12°, and the shearing edge 2 is set back radially inwards of the pitch circle and set back from what would be the dedendum portion of the involute curve. Strict adherence to the involute form is not necessary although the addendum portions of the conjugate surfaces should not exceed the involute form.

As shown in FIGURE 3, two blades generally similar to those shown in FIGURES 1 and 2 are mounted opposite one another on rotatable drums 11 and 12, the leading and trailing blades, 13 and 14, facing rearwardly and forwardly respectively. The shanks of these blades extend radially of the drums. In this figure the blades are shown at first contact with the rod, at 3a, and then in two of the successive positions, at the moment of shearing, 3b, and just before final contact with the rod, 3c. In operation, a steel rod 15 to be severed is fed between the drums 11 and 12, and the drums are driven in synchronism to bring the shearing edges 2 into contact with the periphery of the rod 15 in a single cross-sectional plane at the severing points. The involute-curved blade guide portions 4 engage one another and slide on each other guiding the shear edges 2 into contact with diametrically opposed points on the rod 15. As the drums continue turning, the shear edges cut into the rod at these opposite points. The shearing edges move towards one another as they approach the plane extending through the parallel axes of the drums and severing of the rod is completed when this plane is reached at 3b. It should be understood that the distance between the shearing edges 2 remains in excess of approximately half the diameter of the steel rod 15 throughout the severing operation. The cutting faces 3 are raked back through an angle of approximately 12° to limit damage to the steel rod by the trailing shear blade 14 at the beginning of the severing operation, and by the leading shear blade 13 at the end of the severing operation.

In an alternative construction of shear blade the shank 1 extends parallel to the cutting face 2, and the shank is then mounted on its drum at an angle of approximately 12° to the position occupied by the previously described shearing blade, as shown in FIGURE 4. In both constructions it will be seen that the cutting edge is set back from the radius extending from the centre of the drum to the outermost point of the blade guide portion at the shearing edge side.

As an alternative to the mainly cylindrical shape of rod support surface 5 shown in FIGURE 1, this surface can be of arcuate form in sectional elevation as seen at 17 in FIGURE 3. This surface will still be part of a surface of revolution about an axis approximately tangential to the pitch circle. Theoretically, the leading and trailing support surfaces should be of slightly different radii as seen in FIGURE 3 for the best results to be obtained. However, it has been found unnecessary to use these particular rod support surfaces in practice since for most requirements the several ends do not have to be exactly square and free from all damage. We have therefore used similar support surfaces for these shear blades. A further detail which may be varied is the shaping of guide portions 4 to produce a notch leading to the shear edge. In the shear blade of FIGURES 1 and 2 a V-shaped notch is provided whereas a more arcuate form is adopted in the blades of FIGURE 3.

Figure 5:
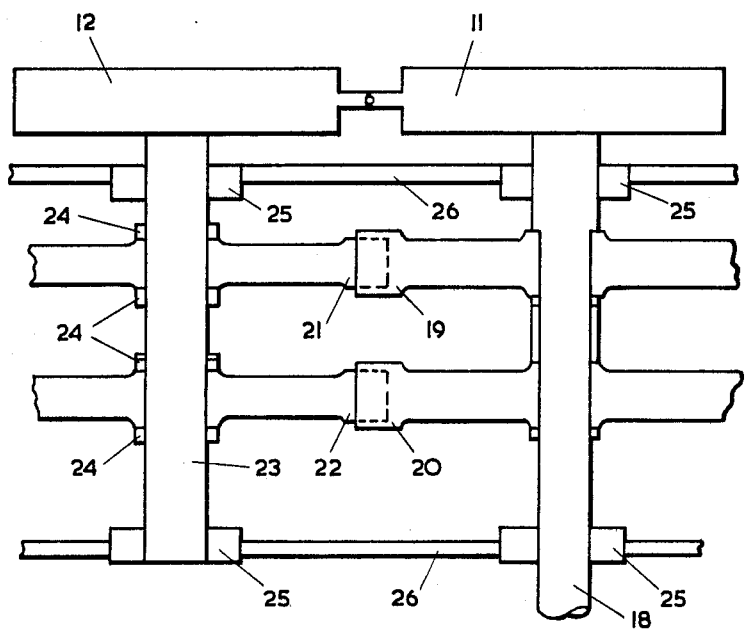
FIGURE 5 shows a sectional elevation of one driving mechanism for the rotatable drums.

By dimensioning and positioning the shear blades so that they are slightly flexible it is possible to take up a fair amount of backlash between the drives to the two drums. With heavier and more rigid shear blades it may be necessary to ensure that the drums rotate accurately in synchronism. One method of achieving this, both with the shear blades described herein and with other shear blades, is shown in FIGURE 5 where drum 11 is driven from a first shaft 18, this shaft having a pair of oppositely handed helical gears 19 and 20 mounted thereon which are in mesh with a second pair of helical gears, 21 and 22, mounted on a second shaft 23 which rotates the other drum 12 and is driven by shaft 18. The helical gears are of opposite hand, those on the shaft 23 being axially adjustable relatively to one another so as to allow circumferential adjustment of one shear blade relatively to the other and the elimination of backlash between the mating helical gears. The axial adjustment of the helical gears 21 and 22 can take place along their keys to the shaft 23, the gears being clamped in any adjusted position, for example by locknuts 24. Each shaft is mounted in bearings 25 in a casing 26.

I claim:

1. An apparatus for severing metal rod stock of circular cross-section comprising a pair of rotatable drums having parallel axes, and a pair of similar shearing blades mounted one on each drum, the shearing blades having conjugate blade guiding portions of approximately involute form and having part-circular shear edges, of slightly larger radius than the rod stock, set back radially inwards of the pitch circle and set back from what would be the dedendum portion of the involute form, such that the shear edges engage the rod stock in a single cross-sectional plane, the shear edges of the two blades being adapted together to contact at least 50% of the cross-sectional periphery of the rod stock during the severing operation.

2. An apparatus for severing metal rod stock of circular cross-section comprising a pair of rotatable drums having parallel axes, and a pair of similar shearing blades mounted one on each drum, the shearing blades having conjugate blade guiding portions of approximately involute form and each having a part-circular shear edge, of slightly larger radius than the rod stock, set back radially inwards of the pitch circle and set back from what would be the dedendum portion of the involute form, such that the shear edges engage the rod stock in a single cross-sectional plane, the shear edge being defined by the intersection of a raked cutting surface with a partial surface of revolution about an axis approximately tangential to the pitch circle.

3. Apparatus as claimed in claim 2, wherein both of the shearing blades have two blade guiding portions, the shear edge being disposed in a notch defined between these portions, and the walls of the notch being shaped to direct rod stock towards the shear edge.

4. An apparatus for severing metal rod stock of circular cross-section comprising a pair of rotatable drums having parallel axes, a pair of similar shearing blades mounted one on each drum, the shearing blades having conjugate blade guiding portions of approximately involute form and having part-circular shear edges set back radially inwards of the pitch circle and set back from what would be the dedendum portion of the involute form, parallel driving shafts for the drums, two pairs of oppositely-handed helical gears mounted on the driving shafts and in mesh with one another, and means for adjusting the axial position of one of the gears on its driving shaft, whereby backlash between the driving shafts may be prevented.

References Cited by the Examiner

UNITED STATES PATENTS

| | | | |
|---|---|---|---|
| 1,941,754 | 1/1934 | Quick et al. | 83—674 X |
| 2,125,939 | 8/1938 | MacFarren | 83—674 X |
| 2,738,842 | 3/1956 | Huck | 83—673 X |
| 2,756,821 | 7/1956 | Phipps | 83—345 |
| 2,868,292 | 1/1959 | Hitchcock | 83—345 X |
| 3,084,582 | 4/1963 | Anderson | 83—674 X |

WILLIAM W. DYER, Jr., *Primary Examiner.*

WILLIAM S. LAWSON, *Examiner.*